United States Patent
Placzek et al.

(10) Patent No.: US 10,363,901 B2
(45) Date of Patent: Jul. 30, 2019

(54) BELT BUCKLE FOR A SAFETY BELT SYSTEM

(71) Applicant: Autoliv Development AB, Vårgårda (SE)

(72) Inventors: Melanie Placzek, Barmstedt (DE); Dietmar Legde, Hamburg (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 343 days.

(21) Appl. No.: 15/118,355

(22) PCT Filed: Feb. 10, 2015

(86) PCT No.: PCT/EP2015/052713
§ 371 (c)(1),
(2) Date: Aug. 11, 2016

(87) PCT Pub. No.: WO2015/121232
PCT Pub. Date: Aug. 20, 2015

(65) Prior Publication Data
US 2017/0182972 A1    Jun. 29, 2017

(30) Foreign Application Priority Data
Feb. 12, 2014   (DE) ................. 10 2014 101 730

(51) Int. Cl.
*B60R 22/28*    (2006.01)
*A44B 11/25*    (2006.01)

(52) U.S. Cl.
CPC .......... *B60R 22/28* (2013.01); *A44B 11/2507* (2013.01); *A44B 11/2523* (2013.01);
(Continued)

(58) Field of Classification Search
CPC .............. B60R 22/28; B60R 2022/281; A44B 11/2507; A44B 11/2561; A44B 11/2523; A44B 11/2546
See application file for complete search history.

(56) References Cited

U.S. PATENT DOCUMENTS 3,583,530 A    6/1971   De Venne et al.
4,454,634 A    6/1984   Haglund et al.
(Continued)

FOREIGN PATENT DOCUMENTS

DE    31 28 139 A1    3/1983
DE    102 59 115 A1   7/2004
(Continued)

OTHER PUBLICATIONS

German Examination Report—dated Oct. 14, 2014.
PCT International Search Report—dated May 29, 2015.

*Primary Examiner* — Robert Sandy
*Assistant Examiner* — Rowland Do
(74) *Attorney, Agent, or Firm* — Brinks Gilson & Lione

(57) ABSTRACT

A belt buckle (1) for a seatbelt system including a spring-loaded lock mechanism (3) having a securing pin (2) for locking a belt tongue (5) inserted into a buckle housing (4), a pushbutton (7), a frame (6) which is displaceably guided on the buckle housing (4) under spring effect to impact upon the lock mechanism (3) for unlocking of the belt buckle (1). In the frame (6) a recess (9) including at least one contact region (8) is formed for guiding and/or retaining the securing pin (2) contacting the contact region (8) upon an actuation of the belt buckle (1). At least one contact region (8) of the recess (9) formed on the pushbutton (7) having a noise-damping element (10, 11) for reducing noise emission in the region where the securing pin (2) abuts against the pushbutton (7).

15 Claims, 3 Drawing Sheets

(52) U.S. Cl.
CPC ...... *A44B 11/2546* (2013.01); *A44B 11/2561* (2013.01); *B60R 2022/281* (2013.01)

(56) References Cited

U.S. PATENT DOCUMENTS

| | | | |
|---|---|---|---|
| 4,597,141 A | | 7/1986 | Wier |
| 4,802,266 A | * | 2/1989 | Doty .................. A44B 11/2523 24/637 |
| 5,341,546 A | * | 8/1994 | Burke ................ A44B 11/2523 24/641 |
| 5,555,609 A | | 9/1996 | Tolfsen et al. |
| 5,722,129 A | | 3/1998 | Harrison et al. |
| 5,915,633 A | | 6/1999 | Biller |
| 5,974,638 A | | 11/1999 | Yamaguchi et al. |
| 6,002,325 A | | 12/1999 | Conaway |
| 6,473,947 B2 | | 11/2002 | Yun |
| 8,907,235 B2 | | 12/2014 | Chevalier et al. |
| 8,955,204 B2 | | 2/2015 | Scharnberg et al. |
| 2005/0086777 A1 | | 4/2005 | Kawai et al. |
| 2005/0135968 A1 | | 6/2005 | Augstein |
| 2005/0257354 A1 | | 11/2005 | Kawai et al. |
| 2008/0163468 A1 | * | 7/2008 | Nakamura ......... A44B 11/2569 24/641 |
| 2012/0324685 A1 | * | 12/2012 | Kataoka ............. A44B 11/2523 24/637 |
| 2013/0174390 A1 | * | 7/2013 | Muromachi ....... A44B 11/2523 24/633 |
| 2016/0302532 A1 | * | 10/2016 | Haas .................. A44B 11/2523 |

FOREIGN PATENT DOCUMENTS

| | | |
|---|---|---|
| DE | 20 2007 011 066 U1 | 11/2007 |
| DE | 10 2008 022 675 B3 | 8/2009 |
| EP | 0 945 082 A2 | 9/1999 |
| EP | 1 525 815 A1 | 4/2005 |
| EP | 1 597 983 A1 | 11/2005 |
| FR | 2 509 616 | 1/1983 |
| JP | 7-505557 | 6/1995 |
| JP | 2823360 | 11/1998 |
| JP | 11-266907 | 5/1999 |
| JP | 2005-144138 | 6/2005 |
| JP | 2005-328864 | 12/2006 |
| WO | WO 94/08480 | 4/1994 |
| WO | WO 96/03896 A1 | 2/1996 |
| WO | WO 2008/145274 A2 | 12/2008 |

* cited by examiner

BELT BUCKLE FOR A SAFETY BELT SYSTEM

CROSS REFERENCE TO RELATED APPLICATIONS

This application claims priority to German Patent Application No. 10 2014 101 730.7, filed on Feb. 12, 2014 and PCT/EP2015/052713, filed on Feb. 10, 2015.

FIELD OF THE INVENTION

The present invention relates to a belt buckle for a seatbelt system including a spring-loaded lock mechanism having a securing pin for locking a belt tongue inserted into a buckle housing, and a pushbutton having a frame which is displaceably guided on the buckle housing under spring effect to impact upon the lock mechanism as necessary for unlocking of the belt buckle. The frame having a recess including at least one contact region is formed for guiding and/or retaining of the securing pin coming into contact with the contact region upon an actuation of the belt buckle

BACKGROUND

A belt buckle is known, for example, from U.S. Pat. No. 4,454,634 which includes a lock mechanism that is spring-loaded in the closing direction. The spring abutting on the lock mechanism is disposed such that when the belt tongue is not inserted, it spring-loads the belt tongue in the opening direction, and with an inserted belt tongue, it spring loads the belt tongue in the closed direction. Only one spring is thus required for the functionality of the lock mechanism. Due to the insertion of the belt tongue, the arrangement of the parts of the lock mechanism with respect to one another, and thus the orientation of the spring, is changed so that during the closing movement from the unlocking position into the locking position, the lock mechanism undergoes a changing spring loading that passes through a neutral position. In the locking position, a lock is held by a securing pin in engagement with the belt tongue. The securing pin is in turn guided in an L-shaped slotted guide system in a buckle housing. The ends of the securing pin are each always located in a recess formed in a frame of a pushbutton.

In a closing process the securing pin is moved in the recess in the frame, wherein after an automatic snap-closing of the lock after it passes through the neutral position, the spring of the securing pin abuts against the frame. To open the belt buckle, with an actuation of the pushbutton, the securing pin is moved from the frame of the button against the spring-load in the L-shaped slotted guide system. Via the lock mechanism, the spring is driven by the securing pin into its neutral position, whereupon an automatic opening of the belt buckle takes place.

When closing and opening of the belt buckle, the securing pin may strike against contact surfaces on the recess of the pushbutton due to the movement triggered by the spring after passing the neutral position, which causes undesirable noise.

In addition, it has been found that both in the locking and unlocking position, the securing pin can strike the contact region of the pushbutton, which generates additional noise.

Due to the increased requirements in modern motor vehicles with regard to acoustic behavior in the interior, it is desirable to reduce as much as possible the noise arising with locking and unlocking the belt buckle as well as during the drive.

The object of the present invention is therefore to at least partially solve the problems with respect to the prior art, and in particular to specify a belt buckle with which noise emission is reduced during locking and unlocking of the lock mechanism, as well as in the locking and unlocking position.

SUMMARY AND INTRODUCTORY DESCRIPTION

The above-mentioned desirable features are achieved in particular in that the at least one contact region of the recess formed on the pushbutton comprises a noise-damping element.

The lock mechanism includes in particular one or more springs, a bar fixing the belt tongue in the locking position and pivotably supported on the buckle housing, a securing pin securing the bar in the locking position, and a spring-loaded lever that works together with the securing pin. Furthermore, an ejector working together with the belt tongue is provided. The lever is in particular pivotably disposed on the ejector actuated by the belt tongue such that during an unlocking- or locking-process, the spring striking the lever can push the lever out of the neutral position either into the locking position or unlocking position. The lever is disposed here such that it holds the securing pin in the locking position such that the securing pin fixes the bar in the locking position. With respect to the more precise function of the lock mechanism, reference is made to U.S. Pat. No. 4,454,634 mentioned above, to which full reference is made with respect to the function of the components of the lock mechanism. Furthermore DE 10 2008 022 675 B3 of the applicant provides a description of the function of the lock mechanism.

The pushbutton includes a region which is actuated for unlocking, as well as a frame that is displaced outward on the buckle housing. A recess is formed in the frame and the securing pin is disposed therein and is also moved therein. By actuating the push button to unlock the belt buckle, the securing pin can be moved, in particular due to its abutment on the frame, relative to the buckle housing and thus also relative to the other elements of the lock mechanism. On the other hand, during insertion of the belt tongue into the belt buckle, the securing pin can be moved relative to the frame in the recess in the frame. In the locking position the securing pin generally abuts against the frame. The positions at which the securing pin comes into contact with the region of the frame adjacent to the recess, and the regions adjacent to these positions, are referred to as the contact region.

The present invention is further characterized in that the at least one contact region includes a noise-damping element. A noise-damping element is in particular an element that at least partially absorbs the kinetic energy of the securing pin and/or of the pushbutton when the securing pin strikes against the contact region, so that a noise-generating vibration of the securing pin, the pushbutton, and/or of a further element of the belt buckle is damped. Due to the proposed arrangement of the noise-damping element, the noise emission from the belt buckle is reduced during locking and unlocking. A further advantage is that rattling noise, in particular of a locked belt buckle, is reduced during the drive.

According to one embodiment of the belt buckle, the noise-damping element is formed from a material applied to the recess, which material damps the striking of the securing pin on the contact region. The noise-damping element is thus formed of a material differing from the material of the pushbutton. The noise-damping material can either be applied to the contact region after the manufacture of the pushbutton, or attached thereto during manufacture of the pushbutton, for example, in a two-component injection-molding process.

An embodiment of the invention provides in particular that the noise-damping material is disposed such that upon actuation of the belt buckle, it comes directly into contact with the securing pin. The point of contact of the securing pin with the frame is thus made from the noise-damping material. The kinetic energy of the securing pin can thus be directly absorbed at least partially by the noise-damping material.

It is seen as particularly advantageous if the noise-damping material deforms during an impact of the locking pin and this absorbs the kinetic energy of the securing pin. Such a noise-damping material can be formed, for example, of rubber or soft plastic.

Alternatively, an embodiment of the invention provides that the noise-damping element is a spring element. In contrast to the above-described embodiment, in this embodiment an area of the contact region is not defined by a noise-damping material, but an element is formed that is deflected from its rest position by the securing pin in order thus to absorb the kinetic energy of the securing pin or the pushbutton. Such a spring element is applied at least to one side on the frame of the pushbutton, and in particular is impacted directly by the securing pin so that the spring element deforms as a whole. The spring element can be made in particular from the same material as the pushbutton itself and thus formed at the same time as the manufacturing of the pushbutton. An additional processing step would thus not be necessary.

In one embodiment of the belt buckle of the present invention, the spring element is deflected transverse to its longitudinal extension upon an impact of the contact region, so that the spring element can absorb the kinetic energy even if the securing pin strikes the contact region at an other-than-usual position on the contact region.

It is an advantage that two spring elements are provided, which between them accommodate the securing pin in a locking position of the belt buckle. This means that in particular two longitudinally extending spring elements are disposed essentially parallel to each other, which spring elements are deflected by the securing pin in a direction transverse to the longitudinal extension. A damping of the kinetic energy thus occurs in two opposing directions, whereby an even greater noise reduction can be achieved.

For a simple manufacture, embodiments of the invention provide that the noise-damping element and the frame are manufactured as material-bonded or as one-piece.

However, it is also possible to attach the noise-damping element to the frame after manufacture of the frame, which then has the advantage that the noise-damping element can be supplied for only specific belt buckles of a production series.

According to another embodiment of the belt buckle of the present invention, the securing pin is guided in an L-shaped slotted guide system in the buckle housing. In belt buckles including an L-shaped slotted guide system in the buckle housing, upon locking the belt buckle, the securing pin generally has a high kinetic energy, which would lead to a high noise emission without a noise-damping element.

BRIEF DESCRIPTION OF THE DRAWINGS

The invention, as well as the technical environment, are explained by examples below with reference to the figures, wherein it should be noted that the figures show advantageous embodiments of the invention, but the invention is not limited to these. The figures schematically show.

DETAILED DESCRIPTION

Figure 1:
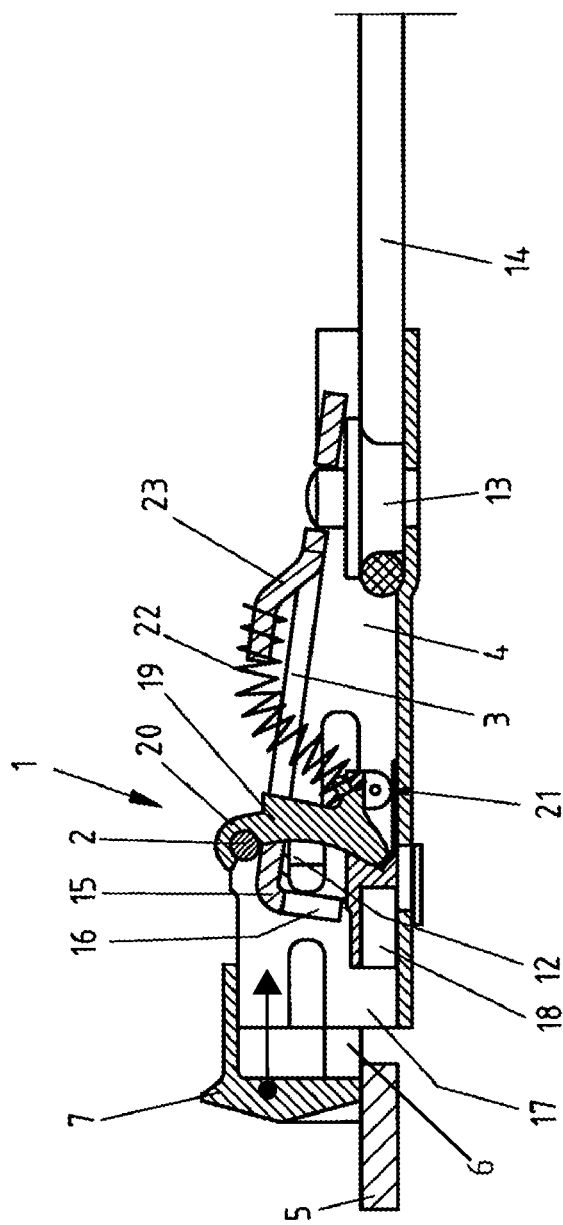
FIG. 1 is a longitudinal section through a belt buckle.

In FIG. 1 a belt buckle 1 known in the prior art is depicted, and includes the following components: a buckle housing 4, a lock mechanism 3 disposed in the buckle housing 4, which lock mechanism 3 is provided for locking a belt tongue 5, and a retaining element 14 attached using an attaching bolt (rivet or stud) 13 to the buckle housing 4, which retaining bolt 14 is provided for attachment on a motor vehicle. The lock mechanism 3 is releasable via a pushbutton 7 displaceably supported on the buckle housing 4. The lock mechanism 3 includes a bar 15 pivotably supported on the buckle housing, which bar 15 includes a lug 16 contoured towards the belt tongue 5, which lug 16 engages in an opening of the belt tongue 5 in a load-bearing manner when the belt tongue 5 is locked. The belt tongue 5 can be pushed into an insertion channel 17 of the buckle housing 4, and when an ejector 18 is pushed in against a spring force, the belt tongue 5 moves in the insertion channel 17 until reaching the locking position. The movement of the bar 15 here is controlled via a securing pin 2, which in turn is guided in an L-shaped slotted guide system 12 in the buckle housing 4. A rocker lever 19 is further provided, which forms the securing pin 2 with a finger 20, and when viewed from the belt tongue 5, engages with an engagement section 21 on the rear side of the ejector. The rocker arm 19 is held spring-preloaded via a first spring 22 on a shoulder 23 of the bar 15. In the position depicted in FIG. 1, the spring 22 is supported on the ejector 18 by its one end in the ejection direction of the belt tongue 5, and by its other end on the bar 15, such that both parts are spring-loaded in the direction of the open position of the lock mechanism 3.

Upon inserting the belt tongue 5 into the insertion channel 17, the ejector 18 is displaced against the spring force exerted by the spring 22 towards the locking position, wherein the rocker arm 19 rotates counter-clockwise. Here the orientation of the spring 22, and thus the acting spring force, changes so that the spring 22 spring-loads the lock mechanism 3 in the closing direction with increasing spring force after passing of a neutral position. Due to the rotational movement of the rocker arm 19, the end of the spring 22 abutting thereon is moved upward, and then while undergoing a counterclockwise pivoting movement, also presses the bar 15 into the locking position, wherein the bar 15 engages in an opening of the belt tongue 5 and thereby locks it. During the closing movement of the lock mechanism 3, the securing pin 2 undergoes a vertical and subsequently horizontal movement into the front position of the L-shaped slotted guide system 12, and thereby secures the bar 15 in the locking position. The spring force exerted by the spring 22 continuously increases towards the locking position of the lock mechanism 3; this change begins when the neutral position is passed and thus causes an acceleration of the closing movement and the lock mechanism 3 snaps closed, and then when the locking position is reached, the closing movement is abruptly braked. Due to the abrupt braking of the closing movement and the meeting of the individual parts of the lock mechanism 3 associated therewith, the undesirable noises can occur, which are to be reduced by the present invention.

Figure 2:
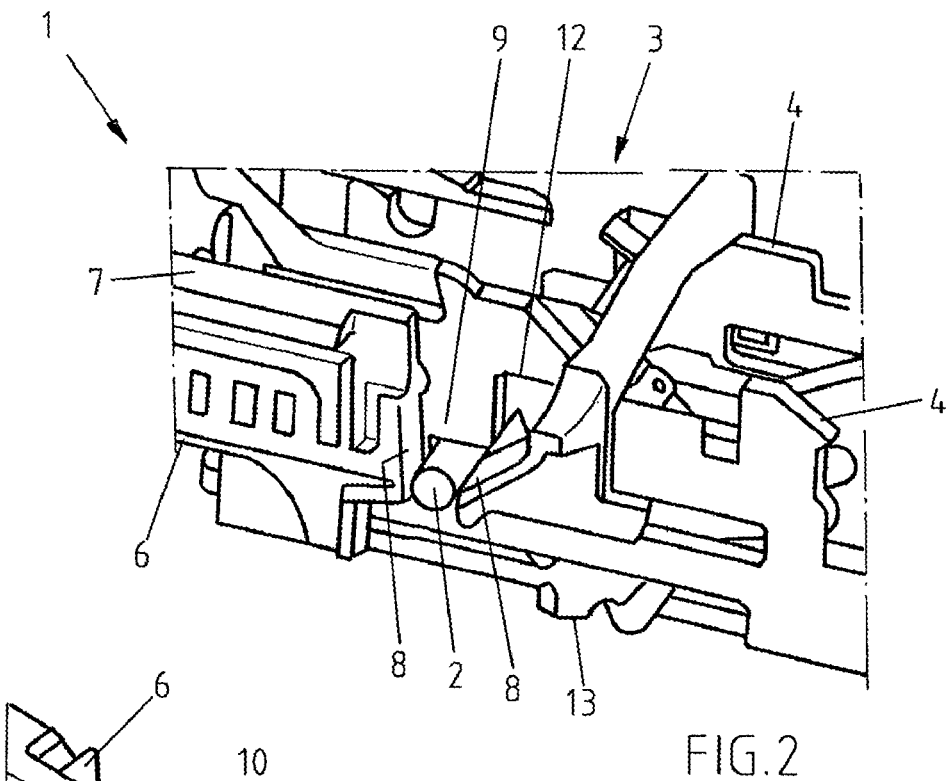
FIG. 2 is a detail view of a belt buckle.

FIG. 2 presents a detail view of a belt buckle 1 in accordance with the present invention, including a lock mechanism 3 disposed in a buckle housing 4. In the buckle housing 4, an L-shaped slotted guide system 12 is formed, wherein a securing pin 2 is guided, which securing pin fixes a bar 15 in the lock mechanism 3 in the locking position. In FIG. 2, the buckle 1 is shown in the locking position.

A pushbutton 7 with a frame 6 is displaceably guided on the outside of the buckle housing 4. A recess 9 is formed in the frame 6 and the securing pin 2 is disposed therein. For a better depiction, in FIG. 2, a part of the frame 6 delineating the recess 9 in the axial direction of the securing pin 2 is cut away. The securing pin 2 abuts against the frame 6 adjoining the recess 9, in a contact region designated by reference number 8.

Figure 3:
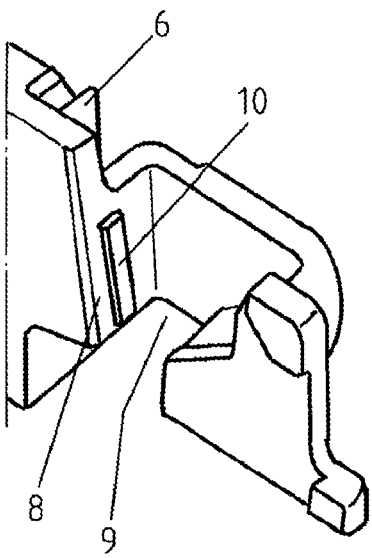
FIG. 3 shows a recess including a noise-damping material.
Figure 4:
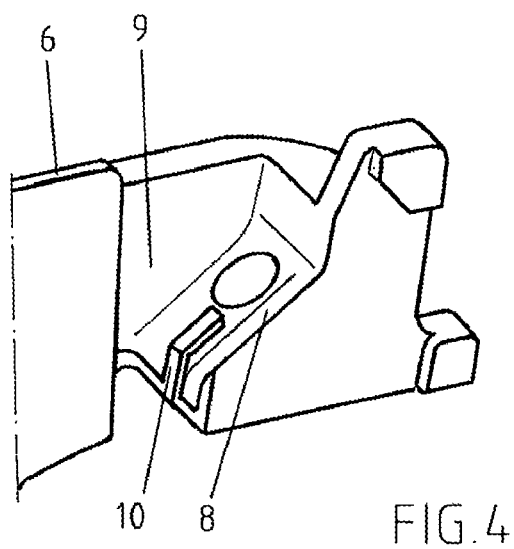
FIG. 4 shows the recess from FIG. 3 in another view.

In FIGS. 3 and 4, the recess 9 from FIG. 2 is depicted in the frame 6 of the pushbutton 7. When actuating the belt buckle 1, i.e., when pushing in the belt tongue 5 or when unlocking, the securing pin 2 comes into contact with the frame 6 of the pushbutton 7, which frame 6 delineates the recess. The contact points and the region surrounding the contact points are understood to be contact regions 8. In the embodiment of FIGS. 3 and 4, a noise-damping material 10 is applied to the contact regions 8. The noise-damping material 8 absorbs the kinetic energy of the securing pin 2 if it impinges on the noise-damping material 10, so that the noise emission is reduced.

Figure 5:
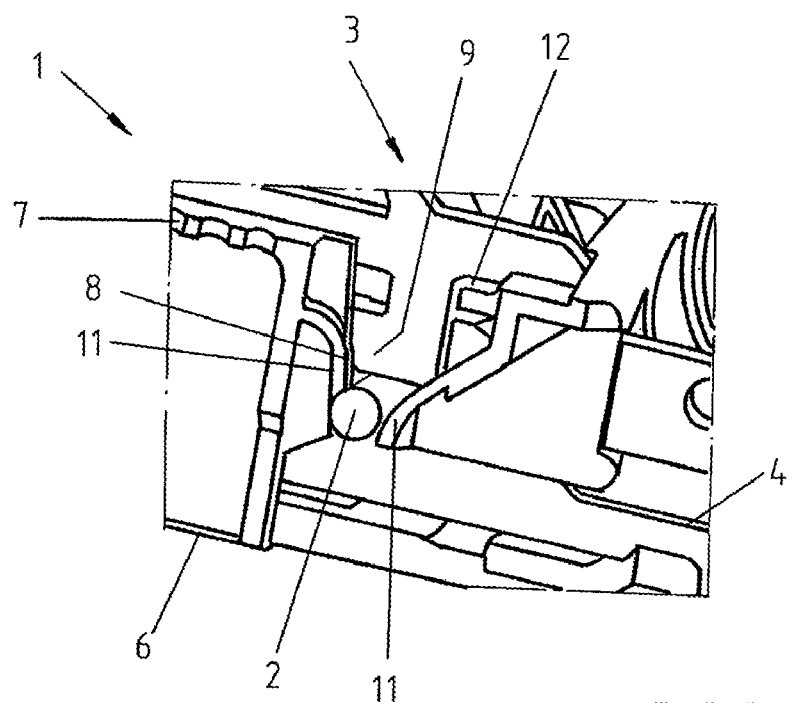
FIG. 5 shows a recess including a spring element and
FIG. 6 is a detail view of the recess including the spring element.
Figure 6:
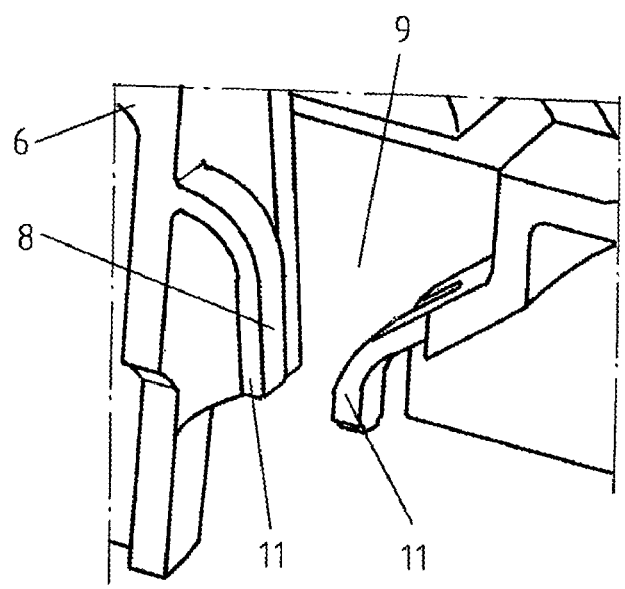

FIGS. 5 and 6 provide a representation similar to that depicted in FIG. 2, wherein the depicted belt buckle 1 only differs in the design of the frame 6 delimiting a recess 9. In the lock position a securing pin 2 guided in an L-shaped slotted guide system 12 of a buckle housing 4 fixes a bar of a lock mechanism 3. The securing pin 2 is also disposed in the recess 9, which is formed in a frame 6 of a pushbutton 7. The recess 9 is shown in FIG. 6 without the securing pin 2.

For the embodiment illustrated in FIGS. 5 and 6 in a contact region 8 of the recess 9, two spring elements 11 are formed, between which the securing pin is located in the locking position. In the unlocking position, the securing pin 2 is disposed in an upper region of the recess 9, while it is located in the vertical section of the L-shaped slotted guide system 12. The spring elements 11 ensure that the kinetic energy of the securing pin 2 is absorbed upon actuating of the belt buckle 1. The spring elements 11 also ensure that in the locking position, the securing pin always abuts against both spring elements 11 so that no rattling noise can arise.

The present invention has the additional advantage that a noise emission is reduced in the region in which the securing pin 2 abuts against the pushbutton 7.

While the above description constitutes the preferred embodiment of the present invention, it will be appreciated that the invention is susceptible to modification, variation and change without departing from the proper scope and fair meaning of the accompanying claims.

The invention claimed is:

1. A belt buckle for a seatbelt system comprising a buckle housing, a spring-loaded lock mechanism, a securing pin for locking a belt tongue inserted into the buckle housing, and a pushbutton including a frame which is displaceably guided on the buckle housing under a spring effect to impact upon the lock mechanism for unlocking the belt buckle, wherein the frame has a recess including at least one contact region for guiding or retaining the securing pin coming into contact with the contact region upon an actuation of the belt buckle, wherein at least one of the at least one contact region of the recess formed on the pushbutton includes a noise-damping element.

2. The belt buckle according to claim 1, wherein the noise-damping element is formed from a noise-damping material applied to the recess, wherein the noise-damping material damps the impact of the securing pin on the contact region.

3. The belt buckle according to claim 2, wherein the securing pin comes directly into contact with the noise damping material upon the actuation of the belt buckle.

4. The belt buckle according to claim 2 further comprising wherein the noise-damping material deforms when impacted by the securing pin upon the actuation.

5. The belt buckle according to claim 1, wherein the noise-damping element and the frame are manufactured as material-bonded or one-piece.

6. The belt buckle according to claim 1, wherein the noise-damping element is applied to the frame after the manufacturing of the belt buckle.

7. The belt buckle according to claim 1, wherein the securing pin is guided in an L-shaped slotted guide system in the buckle housing.

8. The belt buckle according to claim 1, wherein the recess is bordered by a pair of the at least one contact region.

9. The belt buckle according to claim 8, wherein the noise damping element is formed on the pair of at least one contact region.

10. The belt buckle according to claim 1, wherein the at least one damping element forms at least one contact surface extending transverse to a displacement direction of the pushbutton.

11. A belt buckle for a seatbelt system comprising a buckle housing, a spring-loaded lock mechanism, a securing pin for locking a belt tongue inserted into the buckle housing, and a pushbutton including a frame which is displaceably guided on the buckle housing under a spring effect to impact upon the lock mechanism for unlocking the belt buckle, wherein the frame has a recess including at least one contact region for guiding or retaining the securing pin coming into contact with the contact region upon an actuation of the belt buckle, wherein at least one of the at least one contact region of the recess formed on the pushbutton includes a noise-damping element, wherein the noise-damping element is a spring element.

12. The belt buckle according to claim 11, wherein the spring element is deflected transverse to a longitudinal extension of the spring element when the contact region impacts upon the securing pin upon the actuation.

13. The belt buckle according to claim 11, wherein two of the spring elements are provided to accommodate the securing pin therebetween in a locking position of the belt buckle.

14. The belt buckle according to claim 11, wherein the spring element is integrally formed by the frame.

15. The belt buckle according to claim 14, wherein the the spring element contacts the securing pin when the securing pin is engaged with the recess.

* * * * *